No. 770,585. PATENTED SEPT. 20, 1904.
T. IKEMORI.
MOVABLE MAP AND MACHINE FOR OPERATING SAME.
APPLICATION FILED MAY 20, 1903.
NO MODEL. 5 SHEETS—SHEET 1.

Fig.1

WITNESSES:
J. A. Brophy
Geo. Acker

INVENTOR
Tetsutaro Ikemori
BY
Munn
ATTORNEYS.

No. 770,585. PATENTED SEPT. 20, 1904.
T. IKEMORI.
MOVABLE MAP AND MACHINE FOR OPERATING SAME.
APPLICATION FILED MAY 20, 1903.
NO MODEL. 5 SHEETS—SHEET 3.

WITNESSES:

INVENTOR
Tetsutaro Ikemori
BY
ATTORNEYS.

No. 770,585. PATENTED SEPT. 20, 1904.
T. IKEMORI.
MOVABLE MAP AND MACHINE FOR OPERATING SAME.
APPLICATION FILED MAY 20, 1903.
NO MODEL. 6 SHEETS—SHEET 5.

WITNESSES:
J. H. Brophy
Fred Acker

INVENTOR
Tetsutaro Ikemori
BY
ATTORNEYS.

No. 770,585. Patented September 20, 1904.

UNITED STATES PATENT OFFICE.

TETSUTARO IKEMORI, OF NEW YORK, N. Y.

MOVABLE MAP AND MACHINE FOR OPERATING SAME.

SPECIFICATION forming part of Letters Patent No. 770,585, dated September 20, 1904.

Application filed May 20, 1903. Serial No. 157,942. (No model.)

*To all whom it may concern:*

Be it known that I, TETSUTARO IKEMORI, a subject of the Emperor of Japan, and a resident of the city of New York, borough of Manhattan, in the county and State of New York, have invented a new and Improved Movable Map and Machine for Operating the Same, of which the following is a full, clear, and exact description.

The purpose of the invention is to provide a machine having means whereby maps may be moved relatively to each other simultaneously or in any desired sequence and whereby any one map may be independently and singly moved with panoramic effect to demonstrate a certain route, for example, traveled over by a certain party or parties, and to illustrate the geographic features of the countries traversed and the particular line of travel, as from town to town, from city to city, and from country to country, and to provide means for illuminating certain portions of the maps and for displaying at desired intervals illuminated scenes illustrative of certain features or particular situations which may have occurred in the travel of the person or persons and forming the subject of the display or lecture.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Fig. 5 is a vertical central section taken substantially on the line 5 5 of Fig. 2. Fig. 5$^a$ is a sectional view of a portion of one of the spring-rollers. Fig. 6 is a detail plan view of the right-hand portion of the machine. Fig. 7 is a detail view of a detent device for the front lower roller.

Figure 1:
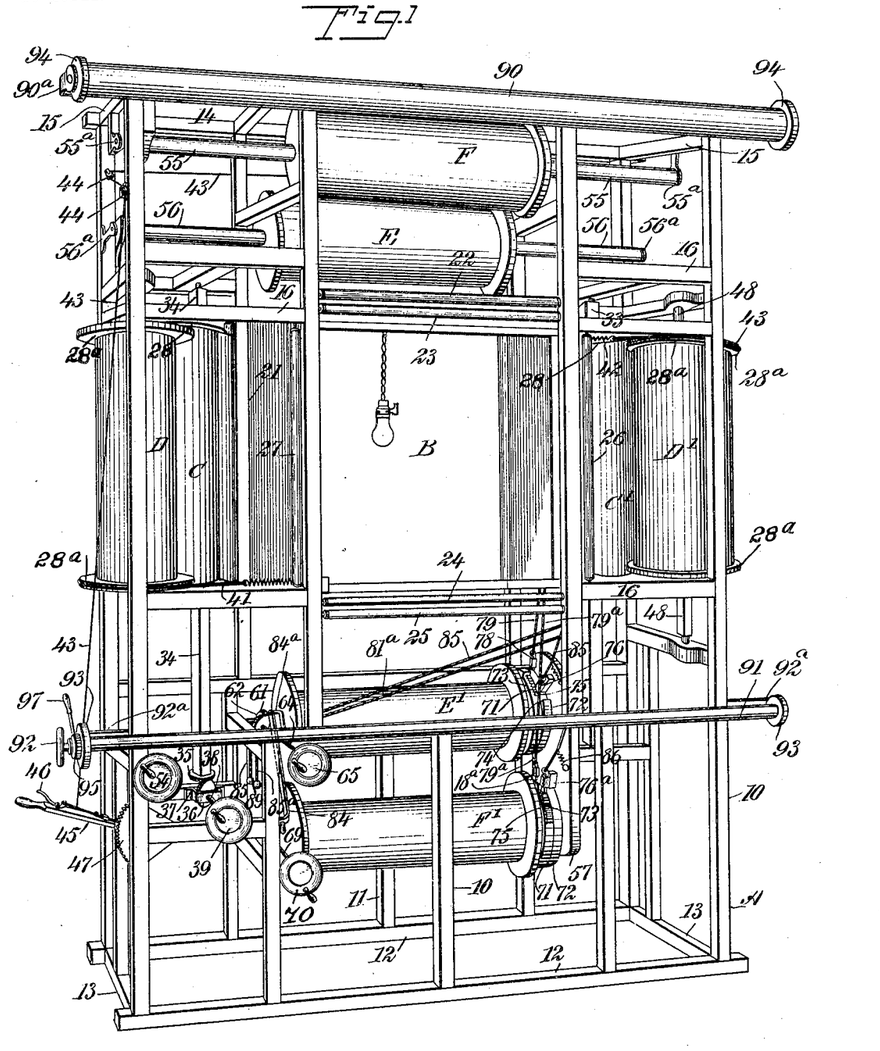
Figure 1 is a perspective view of the machine, the maps being removed with the exception of the rearmost or pictorial map.

A represents the frame of the machine, which, while it may be of any desired shape, is preferably made rectangular and in skeleton form, as illustrated particularly in Fig. 1, wherein it will be observed that the frame consists of front and rear uprights 10 and 11, front and rear base-beams 12, end base-beams 13, and front and rear upper beams 14, and upper end beams 15. The whole structure of the frame is made as light as possible consistent with strength, and the various uprights are strengthened at the front, back, and sides by means of suitable braces 16, preferably horizontally placed.

Figures 5, 5A, 6, 7:
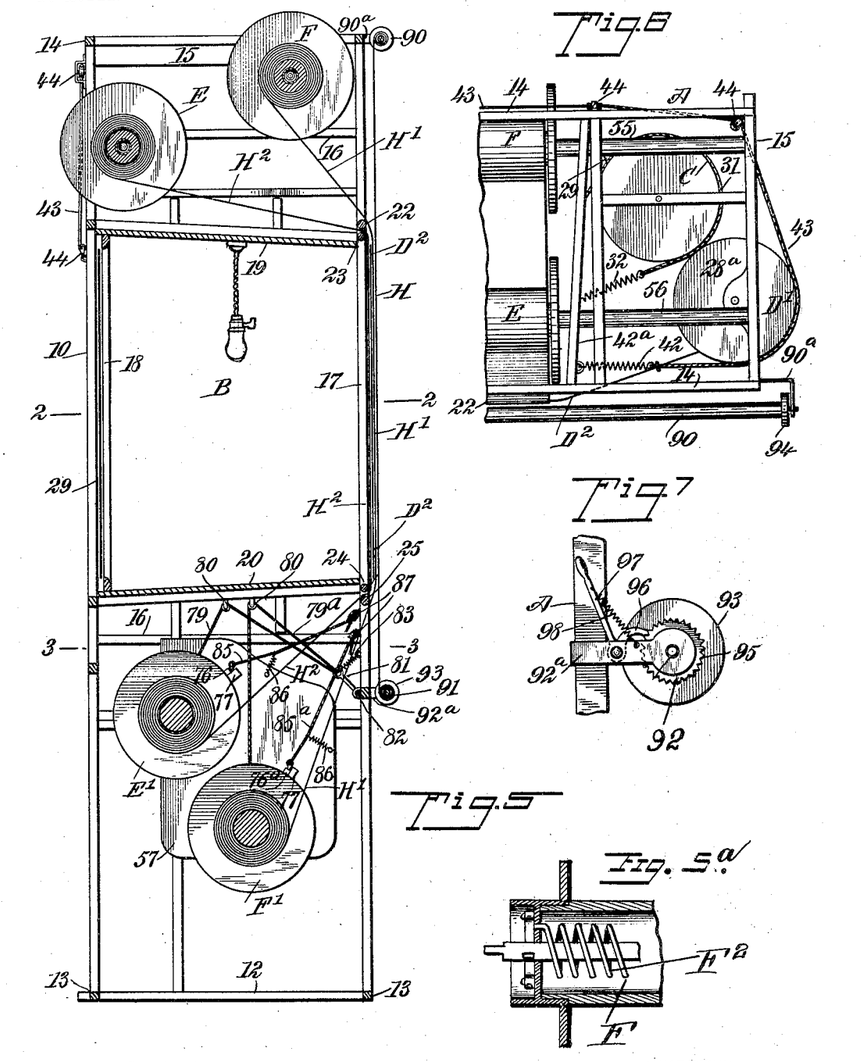

In the construction of the frame a central box or chamber B is provided, the front and rear 17 and 18 whereof is open, and the said chamber B is preferably made wider at the rear than at the front. To that end the top and bottom portions 19 and 20, as shown in Fig. 5, incline from the front, the upper portion upwardly and rearwardly and the bottom downwardly and rearwardly, and the sides 21 of the chamber B, as is shown particularly in Figs. 1 and 2, incline likewise from the open front 17 rearwardly and outwardly in opposite directions to the rear opening 18 of the said chamber. At the front of the frame A just above the chamber B two horizontal guide-rollers 22 and 23 are located, and likewise at the front of the frame and below the said chamber B two other horizontally-disposed guide-rollers 24 and 25 are suitably journaled. At the front side portions of the said chamber B vertical guide-rollers 26 and 27 are journaled in the frame, as is best shown in Fig. 1. At each side of the chamber B at the rear of the frame a roller or drum is vertically mounted, which rollers or drums are designated as C and C'. Each roller or drum C and C' is provided with an upper and a lower flange-head 28, and a pictorial map 29 is normally wound upon the right-hand drum or roller C', being adapted to be subsequently wound upon the opposing drum or roller C, which may be termed the "winding" roller or drum. The roller or drum C', which initially receives the pictorial map 29, may be a spring roller or drum if so desired, and the said pictorial map 29 in its passage from one roller or drum to another is made to pass across the rear opening 18 of the chamber B, as is best shown in Fig. 2, and over rear vertical guide-rollers 30 at the sides of the said chamber, as is also best shown in Fig. 2.

Figure 2:
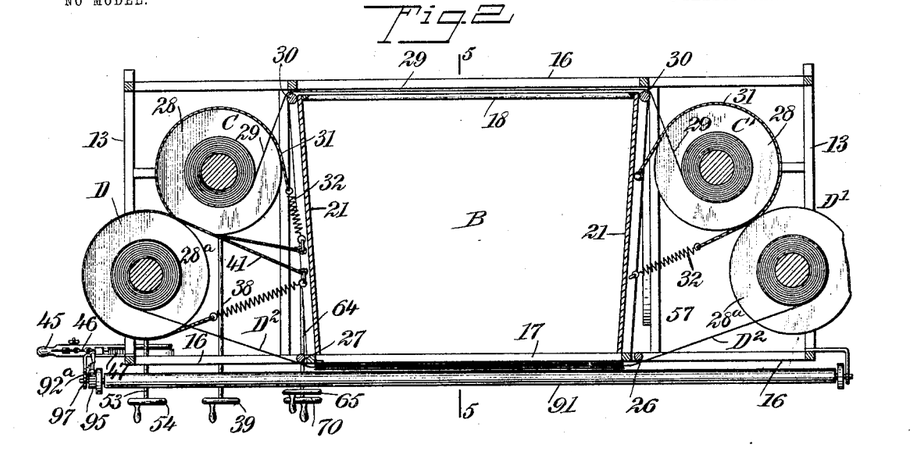
Fig. 2 is a transverse section taken practically on the line 2 2 of Fig. 5.
Figures 3, 4:
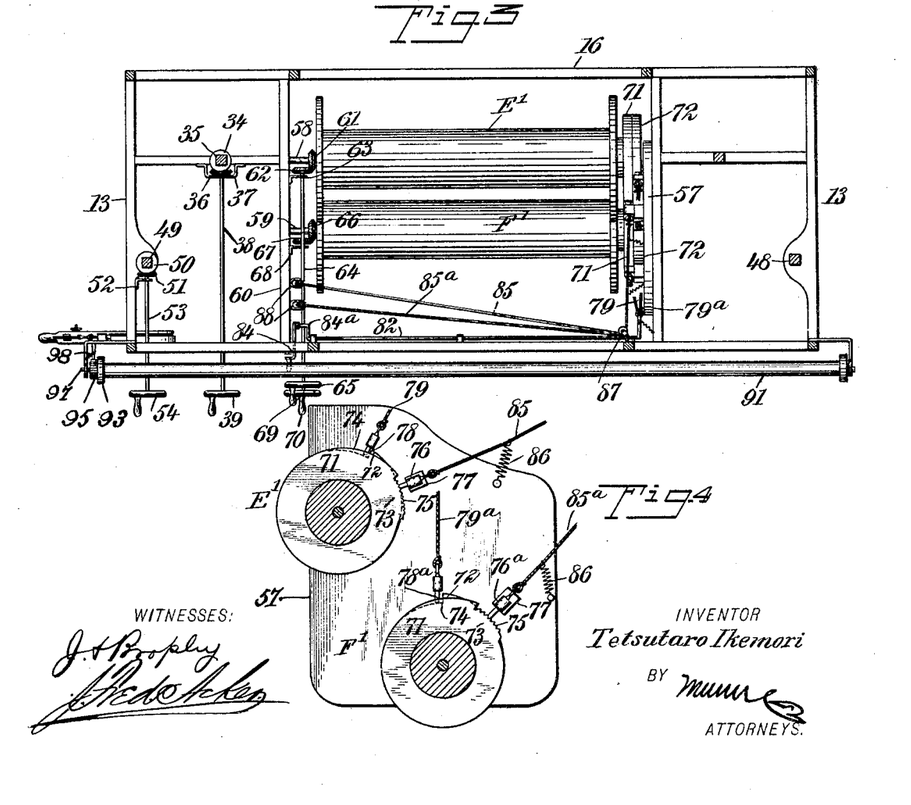
Fig. 3 is a transverse section taken practically on the line 3 3 of Fig. 5.
Fig. 4 is a detail sectional view showing the controlling mechanism for the two lower horizontal drums or rollers.

Each drum or roller C and C' is provided with a strap-brake acting upon its lower flanged head, as is also shown in Fig. 2. Each strap-brake consists of a rope or cable 31, having a spring 32 secured to one end, which rope or cable passes around the lower flanged head of the drum or roller to which it belongs, and the rope or cable of each brake is secured at one end to a suitable support at a side of the chamber B, while the said spring 32 is likewise attached to the same support. Preferably the brake which is adapted to regulate the left-hand or winding roller or drum C is placed under greater tension than the brake for the opposing roller or drum C', as is clearly shown in Fig. 2; but both of these drums or rollers may be subjected to the same tension through the medium of their brakes if in practice it is found desirable. The trunnions 33 of the right-hand drum or roller C' are journaled in suitable bearings in the frame A, as are likewise the trunnions 34 for the winding roller or drum C; but the lower trunnion 34 for the winding roller or drum C is carried some distance down below the lower end of the said winding-drum, as is shown particularly in Fig. 1, and at the lower end of this lower trunnion 34 a beveled gear 35 is firmly secured, which bevel-gear 35, as is shown in Figs. 1 and 3, meshes with the bevel-gear 36, attached to a shaft 38, mounted at its inner end in a suitable bracket-support 37, and this shaft 38 extends, properly supported, out through and beyond the front of the frame A, being provided at its outer end with a suitable hand-wheel 39 or its equivalent. Two other drums or rollers D and D' are likewise mounted to turn, one at each side of the said chamber B, the drums D and D' being in front of the drums C and C' and extending more or less beyond the outer faces of the said rear drums C and C', as is shown in Figs. 1 and 2. These drums or rollers D and D' are likewise provided with flanged heads 28$^a$.

Figure 12:
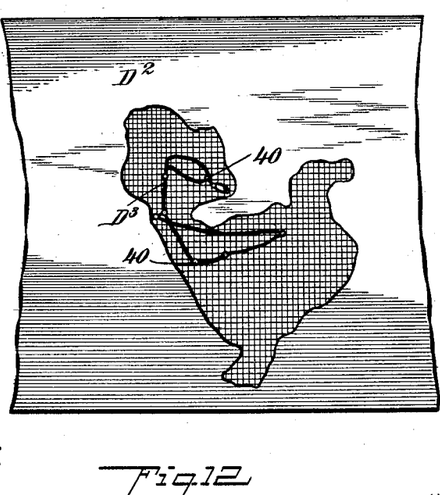

The forward drums or rollers D and D' are adapted to have attached thereto the ends of a gauze map D$^2$, a portion of which map is shown in Fig. 12. The map D$^2$ is initially wound on the right-hand drum or roller D' and is drawn therefrom by the rotation of the opposing or winding drum or roller D. This gauze map D$^2$ passes over the front guide-rollers 26 and 27, as is shown in Fig. 2, and crosses and covers the front opening 17 of the chamber B. It may be here remarked that the said chamber B is illuminated in any desired manner. On this gauze map D$^2$, which may be termed a "route-map," the route D$^3$ is delineated, including the various towns or cities over which the line of travel is supposed to have extended, as is likewise shown in Fig. 12. This route D$^3$ is delineated on the said map D$^2$ by attaching to the gauze body of the map tape, ribbon, or strip of any desired character or of any desired width, and the towns or cities 40 are designated thereon in the usual geographic manner—namely, by circles—or they may be otherwise designated if in practice it is found desirable.

The winding drum or roller D is provided with a spring strap-brake 41 in engagement with its lower flanged head 28$^a$, as is shown in Figs. 1 and 2, and such strap-brake 41 is of the same character as the strap-brakes described with reference to the rear drums or rollers C and C', carrying the pictorial map 29; but the brake for the right-hand roller or drum D' is of a different character from that employed in connection with the left-hand drum or roller D and by preference is located at the upper flanged head of the said drum or roller D', as is shown in Figs. 1 and 6. The brake for the drum or roller D' consists of a spring 42, which at its inner end is secured to a suitable support—the beam 42$^a$, for example, as is shown in Fig. 6—and a cable or rope 43, which is attached to the opposite or outer end of the spring and is carried around the upper flanged head of the said drum or roller D' and from thence over suitable guide-pulleys 44 at the rear and at the right-hand side of the frame A, as is shown in Figs. 1, 5, and 6. The other end of this rope or cable 43 is carried downward, as is particularly shown in Fig. 1, to the lower left-hand side portion of the frame A, where it is attached to a suitably-mounted lever 45, having a thumb-latch 46 for engagement with a rack 47, fixed to the frame. Thus it will be observed that in the event the winding roller or drum D should be turned too far, causing the route on the map to fail to assume a proper position relative to the front of the chamber B, by drawing down on the lever 45 the frictional engagement of the rope or cable with the left-hand drum D' will cause the said drum to turn in a manner to rewind a suitable quantity of the map thereon.

The roller or drum D' is provided with suitable trunnions 48, as is shown in Fig. 1, and trunnions 49 are provided for the opposing or winding roller or drum D. The lower trunnion of the winding drum or roller D extends downward a suitable distance below the bottom of the drum, and at the lower end of the lower trunnion 49, as is shown in Fig. 3, a bevel-gear 50 is firmly secured, which meshes with a bevel-gear 51, mounted on a shaft 53, journaled at its inner end in a bearing 52, and the said shaft 53, suitably supported, extends out through and beyond the front of the frame A, terminating at its outer end in a suitable hand-wheel 54.

Just above the central chamber B, which is illuminated by a lamp or the like, two ordinary spring-rollers E and F are mounted to revolve, which rollers are those known on the market as the "Hartshorn" roller, the roller E being at the rear and the roller F at the front and slightly above the roller E, as is shown best in Fig. 5. One of the said rollers is shown in Fig. $5^a$, and in said figure $F^2$ represents the spring of said roller. The trunnions 55 of the forward spring-controlled roller F are mounted in suitable bearings $55^a$, supported by the frame A, as is shown in Fig. 1, and the trunnions 56 of the rear roller E are mounted in bearings $56^a$, likewise supported by the said frame, as is also shown in Fig. 1. Below the illuminated chamber B at the right-hand side of the frame a board 57 is secured in any suitable or approved manner, and in this portion of the frame two rollers E′ and F′ are mounted to revolve. The roller E′ is at the rear and corresponds to the upper roller E, while the roller F′ is below the roller E′ and is to the front and corresponds to the roller F at the upper portion of the frame, as is best shown in Fig. 5. The lower rollers F′ and E′ are simple rollers and are not spring-controlled. The trunnions 58 of the rear lower roller E′ are journaled one in the board 57 and the other in a support 60, extending from front to rear of the frame, as is shown in Fig. 3, and the trunnions 59 of the lower roller F′ are likewise journaled in the board 57 and the support 60. On the left-hand trunnion of the lower roller E′ a bevel-gear 61 is secured, which meshes with a bevel-gear 62, secured to a shaft 64, mounted to turn at its inner end in bearings 63, attached to the support 60, and the said shaft 64 extends out through and beyond the front of the machine and is provided at its forward or outer end with a suitable hand-wheel 65. The left-hand trunnion of the second lower roller F′ is likewise provided with an attached bevel-gear 66, which meshes with a corresponding gear 67, secured on a shaft 69, which shaft at its inner end is journaled in a bearing 68, secured to the support 60, as is also shown in Fig. 3, and at the outer end of the said shaft 69 a hand-wheel 70 is secured. By means of the gear connections just described the lower rollers E′ and F′ are operated. At the right-hand end of each lower roller E′ and F′ two disks 71 and 72 are located, and the disks of each roller are attached one to the other and are either secured to the right-hand trunnions of the said lower rollers E′ and F′ or are attached in any suitable or approved manner to the right-hand flanged heads of the said lower rollers, as the lower rollers E′ and F′ have flanged heads at each end. The inner disk 71 of each lower roller E′ and F′ is provided with a curved or inclined recess 73, extending in an opposite direction to the direction of rotation of the said rollers, and the outer disks 72 of the said lower rollers E′ and F′ are provided with corresponding recesses 74, which extend in direction of the rotation of the said rollers. The abutment-walls of the recesses 73 and 74 are adjacent to one another, as is illustrated in Fig. 4. It will be understood that the recesses 73 and 74 are peripheral recesses, and the recess 73 of each inner disk 71 of each lower roller E′ and F′ is provided with ratchet-teeth 75, as is shown in Figs. 1 and 4. These ratchet-teeth are segmental, as shown, and are engaged by spring-bolts 76 and $76^a$, the spring-bolt 76 acting in conjunction with the ratchet-teeth for the upper rear roller E′, and the spring-bolt $76^a$ acting in conjunction with the ratchet-teeth 75 of the lower and forward roller F′. These spring-bolts 76 and $76^a$ are attached to the board 57 by means of suitable blocks 77 or their equivalents, or such attachment may be directly made, if desired. Stop-bolts 78 and $78^a$ are employed in connection, respectively, with the rear roller E′ and the forward roller F′, as is also shown in Fig. 4, and these bolts 78 and $78^a$ are likewise carried by the board 57 in any suitable or approved manner. Cords or cables 79 and $79^a$ are secured, respectively, to the stop-bolts 78 and $78^a$, and these ropes, cords, or cables 79 and $79^a$, as is shown in Fig. 5, are carried over guide-pulleys 80, attached to a suitable overhead support. These two cables or ropes 79 and $79^a$ are then carried forwardly and downwardly to an engagement with an eye formed at the upper rear end of a crank-arm 81, which crank-arm is at the right-hand end of a shaft 82, journaled in suitable bearings at the front central portion of the frame, as is shown in Fig. 3. This shaft 82 when operated is returned to its normal position by means of a spring 83, attached to the crank-arm 81 and to the front portion of the frame of the machine. At the left-hand end of the said shaft 82, as is shown in Fig. 3, a second crank-arm $84^a$ is provided, and a lever 84 is attached to this crank-arm $84^a$, extending out at the front of the machine, as is shown in Figs. 1 and 3, so that by operating the lever 84 both of the stop-bolts 78 and $78^a$ may be disengaged from the lower horizontal rollers E′ and F′.

Ropes or cables 85 and $85^a$ are attached, respectively, to the bolts 76 and $76^a$ of the rear and forward lower rollers or drums E' and F', and these bolts 76 and 76ª may be properly designated as "regulating" or "controlling" bolts. In order that the spring-controlled bolts 76 and 76ª shall return readily to their normal position when tension is relieved from the ropes or cables 85 and 85ª, springs 86 are attached to the said cables and to the board 57, as is shown in Fig. 4, which springs being placed under tension when the cables 85 and 85ª are drawn upon serve to automatically return the cables to their normal position when said cables are released from pressure, thus permitting the springs controlling the bolts 76 and 76ª to act without obstruction. These ropes or cables 85 and 85ª, connected with the regulating or controlling bolts 76 and 76ª, are passed over suitable guide-pulleys 87, as is shown in Fig. 3 and 5, located at the right-hand front central portion of the frame A, and the said ropes or cables 85 and 85ª are then carried in direction of the left-hand central portion of the said frame, between the front roller F' and the front of the frame, as is shown in Fig. 3, and downward over suitable guide-pulleys 88, preferably attached to the supporting-beam 60. At the free end of the said ropes or cables 85 and 85ª a weight 89 is secured, as shown in Fig. 1, and these weights are preferably in the form of balls, so that they may be readily grasped by the hand.

In the operation of this form of the machine if the maps to be hereinafter described and carried by the rollers or drums E and E' and F and F' do not suitably register with the front opening of the illuminated chamber B, over which they are to pass, the maps may be properly adjusted by drawing down upon the cables 85 and 85ª, which release the controlling-bolts 76 and 76ª from locking engagement with the lower rollers E' and F', as the bolts will be withdrawn from the teeth 75, and the said terminal ends of the ropes or cables 85 and 85ª being controlled by one hand of the operator while the other hand is utilized to operate the gearing which controls the winding movements of the lower horizontal rollers or drums E' and F', which may be termed "winding" drums or rollers. Should it be necessary to have the maps moved back a predetermined distance on the upper or delivery drums or rollers E and F, in order to obtain a proper register at the front of the illuminated chamber B the lever 84 is operated, thus releasing the stop-bolt 78 and the stop-bolt 78ª from engagement with the lower winding-drums E' and F', being operated, as the bolt in action will be released from engagement with the abutment-wall of a recess 74, thus permitting the spring-controlled upper or delivery rollers or drums E or F to take up any slack that may occur by the manipulation of either one of the lower drums or rollers E' or F'. Under this construction it will be observed that the material carried by the two sets of horizontal rollers is under the complete control of the operator.

Figure 8:
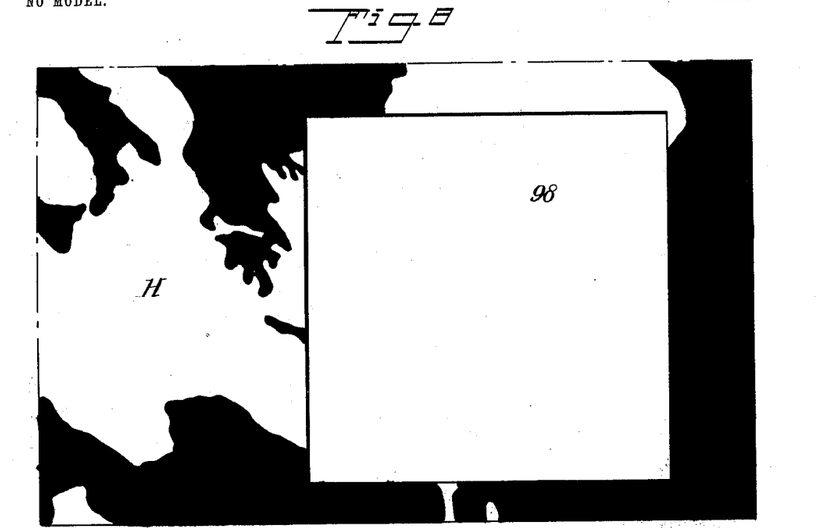
Fig. 8 is a view showing the position of the maps when a clear space is desired to disclose a pictorial scene.
Figure 10:
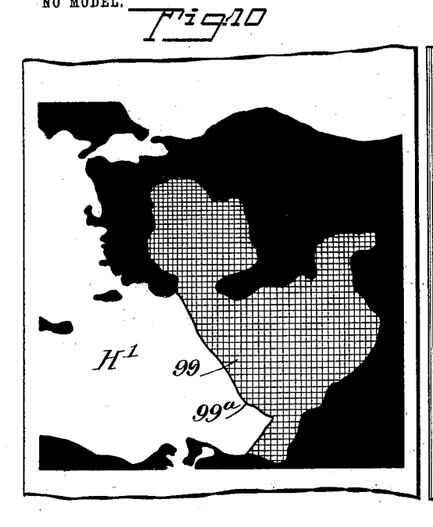
Figs. 10, 11, and 12 are views of portions of the several maps shown in final position in Fig. 9.
Figure 11:
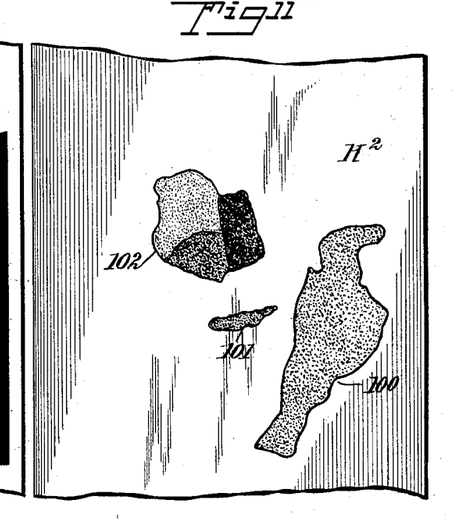

In the further construction of the machine an upper front roller 90 is located at the upper portion of the frame A, extending beyond the front of the frame, and a corresponding lower roller 91 is located likewise in advance of the front of the said frame at a point below the illuminated chamber B. The upper front projecting roller 90 is journaled in suitable bearings 90ª, supported by the frame, and the lower roller 91 is supported in bearings 92ª, as is shown in Figs. 1, 5, and 7. The lower outside front roller 91 is turned through the medium of a hand-wheel 92, preferably secured to or constituting an integral portion of the left-hand end of the said roller, as is shown in Fig. 1, but which is omitted in Fig. 7. The said lower outer roller 91 is provided with flanged heads 93 at its ends, and the upper corresponding roller 90 is provided in similar manner with flanged heads 94. At the left-hand flanged head 93 of the lower outside roller 91 a ratchet-wheel 95 is secured, either to the head or to the left-hand trunnion of the roller, as is shown in Fig. 7, which ratchet-wheel is adapted to be engaged by a detent 96, operated by a lever 97, controlled by a spring 98, as is also shown in Fig. 7, so that this lower roller 91, which is seldom turned, is practically held at all times in the position to which it has been adjusted, yet it can be released conveniently for turning at any time. A map H (shown in Fig. 8) is attached at one end to the upper advance or front roller 90 and at its opposite end to the lower advance or front roller 91, being rolled from the upper roller 90 onto the lower roller 91. This map, which is the primary map, illustrates the country or countries surrounding the particular country or countries to which particular attention is to be called as being traversed and indicating the topography of such country or countries, as well as the political divisions, and to that end said map is provided with an opening 98, which in the proper adjustment of the said map H registers with the front of the illuminated chamber B, so that the view of the interior of said chamber is unobstructed. The intermediate or assembly map H' is attached at one end to the upper forward roller or drum F and to the corresponding lower and forward roller or drum F', and on this assembly-map H' sundry portions of the physical and political divisions of the country may be produced, if desired, and preferably is so produced, as is shown in Fig. 10; but in this assembly-map H' an opening 99ª is made, which is covered with gauze 99, as the primary map H, and the assembly-map H' may consist of paper, parchment, or other solid body. This gauze-covered opening 99ª is given a shape which will coincide with the political divisions and shapes of the various countries, provinces, or islands that are to be shown. A third map H² defines the political divisions of the countries to be illustrated and may be termed a "geographical" map, since on this map an isolated country 100, province, or town is produced, and an island 101, if desired, together with a second province, country, or town 102. This map H² is attached at one end to the upper rear roller or drum E and at its opposite end to the uppermost lower horizontal roller or drum E' and is provided with an opening 110 about the same size as the opening 98 in the primary map H. All these maps H, H', H², and D² pass over the front open portion of the illuminated chamber B. The assembly-map H', passing from top to bottom of the frame, is carried over the outside portion of the upper guide-roller 22 and the lower guide-roller 25. The geographical map H² passes between the upper guide-rollers 22 and 23 and the lower guide-rollers 24 and 25, as is shown in Fig. 5, and the route-map D² passes transversely between the assembly-map and the geographical map over the side guide-rollers 26 and 27, as has been stated. It will be understood that the assembly-map, the geographical map, and the route-map are all provided with openings at one point in their length corresponding to the opening 98 in the primary or front map and the opening at the front of the illuminated chamber B, so that at any time through the adjustment of the drums or rollers carrying these maps the openings just mentioned in all of the maps may be made to register, thus bringing to view a picture or scene on the pictorial map 29 at the rear of the illuminated chamber B.

Figure 9:
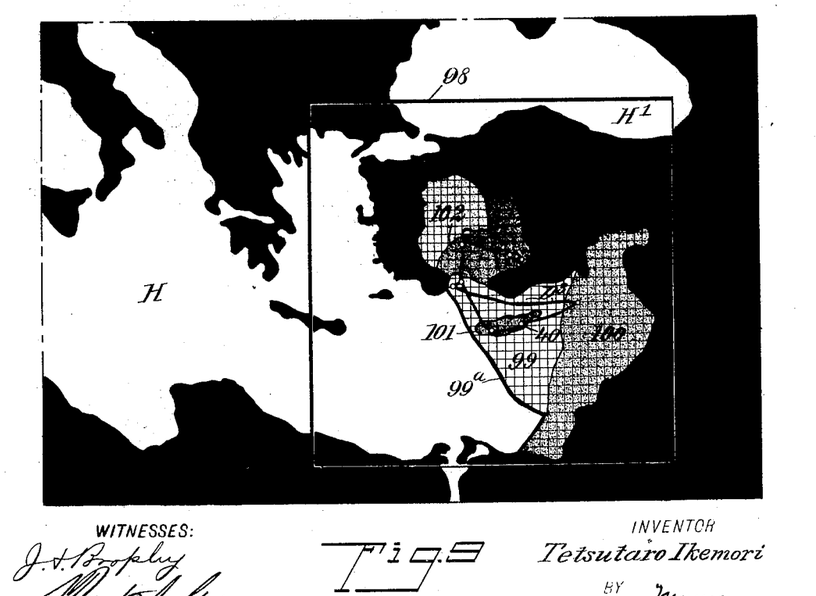
Fig. 9 is a view illustrative of the position of the maps when the complete route of countries or portions of countries traveled over is to be displayed.

In the operation of the machine the front or primary map is brought into position so that its opening 98 will register with the front of the illuminated chamber B. Then in the natural course of the lecture, which the display of the maps is intended to elucidate, the rollers or drums of the assembly-map are operated to bring the gauze-covered opening 99ᵃ at the display-opening 98 in the primary map and in front of the illuminated chamber B. Next the rollers or drum which control the movement of the geographical map H² are operated to bring the various political divisions displayed on that map in proper registry with the said gauze-covered opening 99ᵃ in the assembly-map, and, finally, the rollers controlling the movement of the route-map D² are operated to bring the route or routes delineated on said map in proper registry with the political divisions of the countries displayed on the geographical map, thus producing the result shown in Fig. 9, wherein a complete illuminated map is shown, showing the natural features of special countries and the political divisions of the countries traveled over, portraying the particular route adopted and the towns and cities visited, the said route being clearly presented and in such manner as to be readily comprehended and remembered.

I desire it to be understood that I do not limit myself to the production or illustration of any one or more countries or the political divisions thereof and that various gauze-covered openings may be made in the assembly-map and corresponding political divisions and physical features may be shown on the geographical map, if desired, and that various routes may be depicted upon the route-map, as occasion may require.

Figure 13:
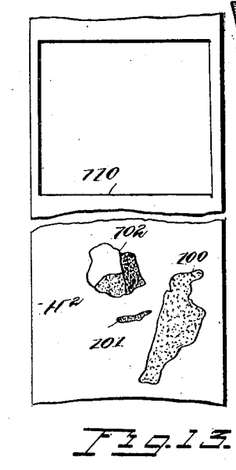
Fig. 13 is a detail view of a portion of the geographical map, illustrating an opening therein through which an unobstructed view of the rear portion of the machine may be obtained.

With reference to Fig. 13 it may be here stated that the map has been broken through between the delineations thereon and the said opening, as considerable space intervenes the said opening and said delineations. The opening 110 is never brought into action until the openings in all the other maps have been brought in alinement, and then this particular opening of this particular map is brought into alinement with the other openings, so that the picture exhibited at the rear of the device in the illuminated chamber may be rendered unobstructedly visible.

In the arrangement of the several maps it will be observed that each map is individually operated, and when an illuminated picture is to be exposed each map is operated until the main opening in the map is brought opposite the open front of the said chamber.

Having thus described my invention, I claim as new and desire to secure by Letters Patent—

1. In a display device, a support, a primary map having an opening therein, a movable geographical map, a movable assembly-map likewise provided with an opening and located between the primary and geographical maps, and a route-map arranged for display relation to the geographical and the assembly maps, for the purpose specified.

2. In a display device, a support, a primary map having an opening therein, a movable geographical map, a movable assembly-map likewise provided with an opening and located between the primary and geographical maps, and a route-map having a transparent panel and arranged to coact with the assembly and geographical maps, as described.

3. In a display device, a support, a primary map having an opening therein, a movable geographical map, a movable assembly-map likewise provided with an opening and located between the primary and geographical maps, a route-map having a transparent panel arranged to coact with the assembly and geographical maps, and means carried by the support for independently moving each map, as set forth.

4. In a display device, a support, a primary map having an opening therein, a movable geographical map, a movable assembly-map likewise provided with an opening and located between the primary and geographical maps, a route-map having a transparent panel and arranged to coact with the assembly and the geographical maps, means carried by the support for independently moving each map, a pictorial map independent of the foregoing maps, a chamber capable of illumination at the back of which the pictorial map is arranged, the other maps being at the front of the said chamber, and all being arranged for operation, substantially as described.

5. In a display device, a support, a primary map having an opening therein, a movable geographical map, a movable assembly-map likewise provided with an opening and located between the primary and geographical maps, a route-map having a transparent panel and also arranged to coact with the assembly and the geographical maps, means carried by the support for independently moving each map, a pictorial map independent of the other maps, a chamber capable of illumination at the back of which the pictorial map is arranged, the other maps being at the front of said chamber and arranged to cross each other, the opening in the primary map being adapted to register with the front of the said illuminated chamber, which is open at the front and back, the geographical and assembly maps in one position uncovering the said chamber and the opening in the primary map, bringing the said chamber and opening in unobstructed registry to effect a display of the pictorial map, as specified.

6. In display device, a support, a chamber within the said support, adapted to be illuminated, being open at its front and at its rear, a movable primary map located at the front of the support, having an opening therein arranged to register with the front of the said chamber, movable assembly and geographical maps likewise adapted to cross the front of said chamber, being arranged at the rear of the primary map, the assembly-map having an opening therein and the geographical map figures thereon adapted to be fitted to the opening in the assembly-map, and a route-map having a transparent panel with predetermined routes delineated thereon, and independent operating mechanisms for each map, the figures on the geographical map being adapted when over the opening in the assembly-map to be partially covered by the route delineated on the route-map, as described.

7. In a display device, a support, a chamber within the said support and adapted to be illuminated, being open at its front and at its rear, a movable primary map located at the front of the support, having an opening therein arranged to register with the front of the said chamber, movable assembly and geographical maps likewise adapted to cross the front of the said chamber, being arranged at the rear of the primary map, the assembly-map having an opening therein and the geographical map figures thereon adapted to be fitted to the opening in the assembly-map, a route-map having a transparent panel with predetermined routes delineated thereon, independent operating mechanisms for each map, the figures on the geographical map being adapted when registering with the opening in the assembly-map to be partially covered by the route delineated on the route-map, a pictorial map extending at the rear of the said illuminated chamber, and means for operating the said pictorial map independent of the primary, geographical or route map, said pictorial map being displayed when all of the other maps with the exception of the primary map are withdrawn from covering position relative to the front of the said chamber, the opening in the primary map registering with the said chamber, as described.

8. In a display device, a frame having a chamber formed therein adapted to be illuminated, which chamber is open at its front and at its back, a primary map having an opening therein adapted to register with the front opening of the said chamber, extending vertically of the said frame, roller-supports for the said primary map, a geographical map located between the primary map and the said chamber in the frame, the said geographical map having political divisions defined thereon, an assembly-map adapted to operate between the geographical map and the primary map, having an illuminated section of a contour corresponding to the contour of the political divisions on the geographical map, the said geographical and assembly maps extending vertically across the front of the said chamber, roller-supports for the latter maps, and a route-map extending transversely of the said chamber at the back of the primary map and having a transparent panel, the transparent panel of the route-map having opaque route-lines delineated thereon, roller-supports for the route-map, and means for independently operating either of the maps, as described.

9. In a display device, a frame having a chamber formed therein adapted to be illuminated, which chamber is open at its front and at its back, a primary map, having an opening therein adapted to register with the front opening of the said chamber, extending vertically of the said frame, roller-supports for the said primary map, a geographical map located between the primary map and the said chamber in the frame, the said geographical map having political divisions defined thereon, an assembly-map adapted to operate between the geographical map and the primary map, having an illuminated section of a contour corresponding to the contour of the political divisions on the geographical map, the said geographical and assembly maps extending vertically across the front of the said chamber, roller-supports for the latter maps, and a route-map having a transparent panel, extending transversely of the said chamber at the back of the primary map, the transparent panel of the map having opaque route-lines delineated thereon, roller-supports for the route-map, means for independently operating either of the maps, the assembly and the geographical maps having an opening therein corresponding to the opening in the primary map, a pictorial map guided at the rear of the said chamber, roller-supports for the pictorial map, and means for operating the latter roller-supports, whereby when desired a clear opening may be obtained from the front into the said chamber to display the illustrations on the pictorial map, as described.

10. In a display device, a frame having a chamber formed therein, open at its front and at its back, vertically-located rollers or drums at each side of the said chamber, the arrangement of the drums corresponding at each side of the chamber, upper and lower correspondingly-arranged drums above and below the said chamber, brakes for the vertical drums or rollers, means for turning the vertical rollers at one side of the said chamber, mechanism for turning the lower rollers or drums, the upper rollers or drums being spring-controlled, and adjusting and limiting devices for the said lower rollers or drums, as described.

11. In a display device, a frame having a chamber formed therein, open at its front and at its back, vertically-located rollers or drums at each side of the said chamber, the arrangement of the drums corresponding at each side of the chamber, upper and lower correspondingly-arranged drums above and below the said chamber, brakes for the vertical drums or rollers, means for turning the vertical rollers at one side of the said chamber, mechanism for turning the said rollers at one side of the said chamber, means for turning the lower rollers or drums, the upper rollers or drums being spring-controlled, adjusting and limiting devices for the said lower rollers or drums, an upper front roller extending out beyond the front of the frame, a corresponding lower front roller extending also outward from the front of the frame, bearings for the two rollers, means for turning the lower front roller, and a detent device for said lower front roller, all operating in the manner specified.

12. In an educational device, a map having an opening therein, a transparent covering for the opening, and ribbon-like designating-routes delineated upon the covering, as set forth.

13. In a display device, a support, a primary map having an opening therein, a movable geographical map and a movable assembly-map also provided with an opening and located between the primary and geographical maps, as described.

14. In a display device, a support, a primary map having an opening therein, a movable geographical map, a movable assembly-map also provided with an opening and located between the primary and geographical maps, and a route-map having a gauze section and ribbon-like opaque delineations on the material of the gauze sections, the route-map being adapted to coöperate with both the geographical and assembly maps, as described.

15. In an educational device, a primary map having an opening therein, movable maps visible at the opening in the primary map and bearing geographical subjects adapted to be read at the opening in the primary map and in connection with the latter map, and means for operating the auxiliary maps with relation to the primary map and with relation to each other, as described.

16. In an educational device, overlying movable maps, and means for independently moving each map, sundry of the maps having openings therein to disclose sections of other of the maps, all of the maps being capable of illumination, as described.

In testimony whereof I have signed my name to this specification in the presence of two subscribing witnesses.

TETSUTARO IKEMORI.

Witnesses:
J. FRED. ACKER,
A. M. KASHIWA.